(12) United States Patent
Maa

(10) Patent No.: US 7,030,845 B2
(45) Date of Patent: Apr. 18, 2006

(54) DIGITAL ENHANCEMENT OF STREAMING VIDEO AND MULTIMEDIA SYSTEM

(76) Inventor: Shalong Maa, 18250 Marsh La. #217, Dallas, TX (US) 75287

( * ) Notice: Subject to any disclaimer, the term of this patent is extended or adjusted under 35 U.S.C. 154(b) by 271 days.

(21) Appl. No.: 10/340,429

(22) Filed: Jan. 10, 2003

(65) Prior Publication Data

US 2003/0140346 A1 Jul. 24, 2003

Related U.S. Application Data

(60) Provisional application No. 60/421,493, filed on Oct. 28, 2002, provisional application No. 60/401,795, filed on Aug. 7, 2002, provisional application No. 60/350,433, filed on Jan. 20, 2002.

(51) Int. Cl.
*G09G 3/36* (2006.01)

(52) U.S. Cl. .............. 345/88; 345/690; 345/613; 345/614; 382/299

(58) Field of Classification Search ............ 345/671, 345/690, 614, 613, 612, 604, 603, 90, 88, 345/87, 694, 699, 89; 382/298, 299, 162; 348/179, 557; 725/87; 715/90
See application file for complete search history.

(56) References Cited

U.S. PATENT DOCUMENTS

| | | | | |
|---|---|---|---|---|
| 5,125,046 A | * | 6/1992 | Siwoff | 382/114 |
| 5,537,156 A | * | 7/1996 | Katayama | 348/716 |
| 5,689,283 A | * | 11/1997 | Shirochi | 345/698 |
| 5,821,913 A | * | 10/1998 | Mamiya | 345/88 |
| 6,104,375 A | * | 8/2000 | Lam | 345/589 |
| 6,133,960 A | * | 10/2000 | Mendenhall | 348/561 |
| 6,460,127 B1 | * | 10/2002 | Akerib | 712/10 |

* cited by examiner

*Primary Examiner*—Amr A. Awad
*Assistant Examiner*—Abbas Abdulselam
(74) *Attorney, Agent, or Firm*—Shalong Maa (57) ABSTRACT

Disclosed herein are methods and systems for enhancing digital streaming video. According to the present invention, the pixel resolution of the image frame of a digital streaming video, i.e., the numbers of pixels within said image frame, are artificially amplified by increasing the number of columns and rows of pixels therein. The color characters, such for examples as the color, contrast, brightness, saturation, hue, and/or luminescence, etc., of each newly created pixel or cell are obtained according to the color characters of those original neighboring pixels. The boundary or border of an image-element within said image frame may be improved by adjusting the color characters of those newly created or child pixels that are situated at or close to said image-element boundary. As a result, a small-frame digital video can be displayed as a large-frame high-resolution video having similar or even better image quality.

13 Claims, 3 Drawing Sheets

DIGITAL ENHANCEMENT OF STREAMING VIDEO AND MULTIMEDIA SYSTEM

This Application claims the benefits of U.S. Provisional Patent Application No. 60/350,433 filed Jan. 20, 2002, U.S. Provisional Application No. 60/421,493 filed Oct. 28, 2002, and U.S. Provisional application No. 60/401,795 filed Aug. 7, 2002, of which the complete disclosures are incorporated fully herein by reference.

FIELD OF THE INVENTION

The present invention pertains generally to encoding, decoding and display of digital streaming video, and in particular, to methods and system for decoding and enhancement of digital streaming video such that a small-frame digital streaming video or a digital picture can be enlarged and displayed on a large screen with high resolution and quality.

BACKGROUND OF THE INVENTION

With the increasing popularity of interactive electronic networks, such as the Internet and the World Wide Web, and the advent of digital video technologies, the services of providing digital streaming content via the Internet are drawing more attention in the market place. It is well known that the delivery bandwidth available for transmitting digital video stream or the like to a client home computer is, in general, limited by the network- or Internet-connection speed. As a result thereof, the qualities of the video stream for presentation on a computer monitor or on a large screen display, such as the video frame size and image quality thereof, are spared. Thus, the methods and system needed for compressing digital video data and for decoding and image enhancement is of paramount importance for distributing digital video through the Internet.

The limited data delivery bandwidth available for transmitting digital streaming video and the volume of information represented by such digital images have given rise to the development of various compression "standards", such as JEPG, H.263, MEPG-2, etc. One basic element of some of these compression methods or standards (e.g., H.263) is to calculate or "predict" the motion of an "image block" in a video stream or image sequence: A video stream is organized hierarchically into groups of image-frame sequence, with each frame including a number of "macro-blocks" for defining the respective portion of the video image therein; An independent frame or "I-frame" is encoded independently of all other frames; Dependent frames are the predictive motion-compensated image frames within a image frame sequence, and are therefore encoded in a manner of depending upon an I-frame and/or on other preceding dependent frames within the same sequence. Since a motion video stream comprises sequences of images that vary incrementally within each sequence, substantial compression can be realized by encoding a number of frames as motion-compensated or dependent frames. The decoding or the reverse process of encoding or compressing the digital images is performed at the client side such that the original image stream can be presented on a display.

Image enhancement generally refers to performing certain operations on video image data to improve image quality of a video stream or a single image frame. Such an operation may include, for examples, contrast manipulation, noise reduction, edge sharpening and/or crisping, filtering, improving digital resolution, magnification and interpolation and the like. It is well known that operations such as transmission over an information network will cause degrading of image signal as a result of noise fluctuation. Prior art image enhancement method, such as the so-called "coring" method or the like, focuses on utilizing filtering (high-pass/low-pass) technique for separating and removing noise from image signal, assuming that noise fluctuations are of relatively small amplitude in comparison to the information components of an image signal, and are concentrated in the high-pass component of the filtered signals.

Although the prior art streaming video compression and enhancement methods outlined above make it feasible for transmitting digital video stream to a client computer over information network having limited delivery bandwidth, such as from a web site to a home computer provided with "dial-up" Internet connection, such compression and enhancement are achieved at the expense of video image signal loss. The prior art video image enhancement method described above only provides means for reducing fluctuating noise signals, and does not improve the quality of the compressed video stream signals at the client side. As a result thereof, a video clip transmitted from a web site using the existing compression and enhancement technologies can only be presented in form of small-image-frame video for display on the computer monitor and be viewed by a user sitting very close to the monitor.

It is known in the art, with respect to the general tendency of information technologies, that the processing speed of personal computing devices such as the PCs will keeps improving, while it would be very expensive or virtually impossible to substantially improve the Internet connection bandwidth of an average household beyond that of the so-called DSL or cable connection. Consequently, there is a need in the art for providing a method of enhancing image signals of a digital video stream by taking advantage of the computing power of a client personal computing device such as the PC.

SUMMARY OF THE INVENTION

Accordingly, an object of the present invention is to provide a method of enhancing the image quality of a digital video stream such that a small-frame image or image stream or video transmitted through a network can be displayed as a large-frame video or image having similar or even better image quality; Such an enhancement effect is accomplished by taking more advantage of the computing power of a client computer than merely performing the decoding or the reverse process of encoding or compressing the digital images.

Another object of the present invention is to provide a digital video enhancement method and system for amplifying the pixel resolution and/or enriching the color of a digital video or image stream and for sharpening the image-element boundary therein so as to improve the image quality of the video or image to be displayed on a relatively large screen.

To achieve the foregoing and other objects of the present invention and to remedy drawbacks of the prior art described above, there is provided a novel method for enhancing the quality of a digital video. According to the present invention, the image frame resolution, i.e., the numbers of columns and rows of pixels of a digital video image frame, is artificially amplified by a client computer by increasing the number of columns and rows of pixels of said image frame. It is preferred that such a pixel resolution amplification process is accomplished by dividing a portion or all of the original pixels forming the original image frame into a plurality of sub-pixels. The color characters, such, for examples, as the color, contrast, brightness, saturation, hue, and/or luminescence, etc., of each newly created pixels or sub-pixels are obtained and/or adjusted according to those of the neighboring original pixels or cells. The present invention may also be understood as a method of improving the image pixel resolution of a digital video.

The foregoing is intended to be merely a summary, and not for limiting the scope of the present specification. The features of the invention that are believed to be novel are set forth with particularity in the Claims. The invention, together with further objects and advantages thereof, may best be appreciated by reference to the following detailed description taken in conjunction with the drawings.

BRIEF DESCRIPTION OF THE DRAWINGS

FIG. 2 is a schematic representation of a video image frame and a pixel block therein for illustrating the digital image enhancement method of the present invention.

FIGS. 3–4 are enlarged view of the respective pixels portion of the image frame of FIG. 2; FIGS. 4A and 4B are for depicting the image edge sharpening method of the present invention.

FIGS. 5–6 illustrate the method of obtaining color characters of newly created or amplified pixels or sub-pixels of FIGS. 2–3 based on those of the neighboring original pixels according to the present invention; FIG. 5 is for representing the horizontal direction of the image frame of FIG. 2; FIG. 6 is for representing the vertical direction of the image frame of FIG. 2.

DETAILED DESCRIPTION OF THE INVENTION

Referring to FIGS. 1–8, there is shown a new digital video image enhancement method embodying the concepts of the present invention. While the present invention is susceptible to embodiments in various forms, there is provided detailed description of the presently preferred embodiments, with the understanding that the present disclosure is to be regarded as exemplifications, and does not limit the invention to the specific embodiments illustrated. In some instances, for purposes of explanation and not for limitation, specific numbers, diagrams, or dimensions, etc., may be set forth in order to provide a thorough understanding of the invention. In other instances, detailed descriptions of well-known elements or electronic circuitry or computer/electronic network components are omitted so as to not obscure the depiction of the invention with unnecessary details. In case when alternate arrangements of an element or component are described or displayed, like parts or components may be assigned with the same numerical reference numbers.

Figure 1:
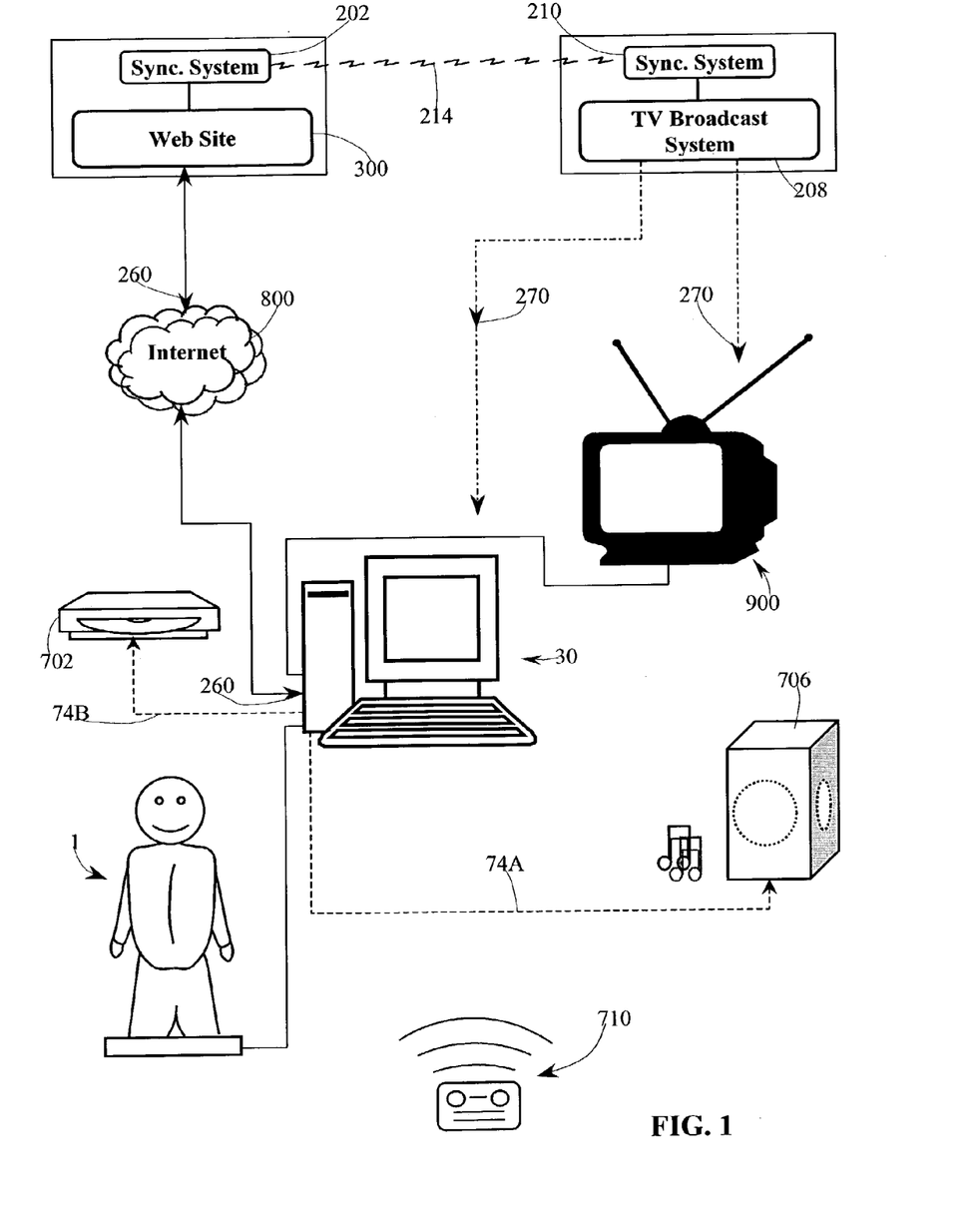
FIG. 1 illustrates an interactive home entertainment system and a exemplary simplified client-server architecture for implementing the methods of the present invention.

Referring first to FIG. 1, a home entertainment system may include a TV system 900, a multimedia client computer 30, a physical toy FIG. 1 adapted to be controlled by the computer 30, and a hand-held remote control device 710 for control of all other elements of the entertainment system. In addition, said entertainment system may also include other type of electronic devices such as a sound system 706 or a DVD player 702, etc. The computer 30 is connected to a web site 300 via the Internet 800. A TV broadcast center 208 provides the conventional TV programs or streaming video 270 to the TV set 900 and/or to the computer 30. The streaming video 270 may also be transmitted from the web site 300 to the computer 30. The toy control data 260 for controlling the sound and animation of the toy FIG. 1 may be transmitted from the web site 300 to the computer 30 via the Internet or be created by the computer 30. Web site 300 and the TV broadcasting system 208 are provided with synchronization systems 202 and 210 respectively. The Web site 300 usually includes a Web server processing system for serving or providing Web content such as a video clip or a HTML document requested by the client computer 30. In a standard request-response process for viewing a graphical content by the client, the client system 30 specifies the URL or IP address of said content in a request, which is forwarded to the corresponding Web site 300 supporting such content. In response thereto, the Web server 300 will send the requested content to the client 30. Typically, the Web site 300 also includes application or programming system and database system for implementing a business entity's various business applications.

Figures 2, 3, 4A, 4B:
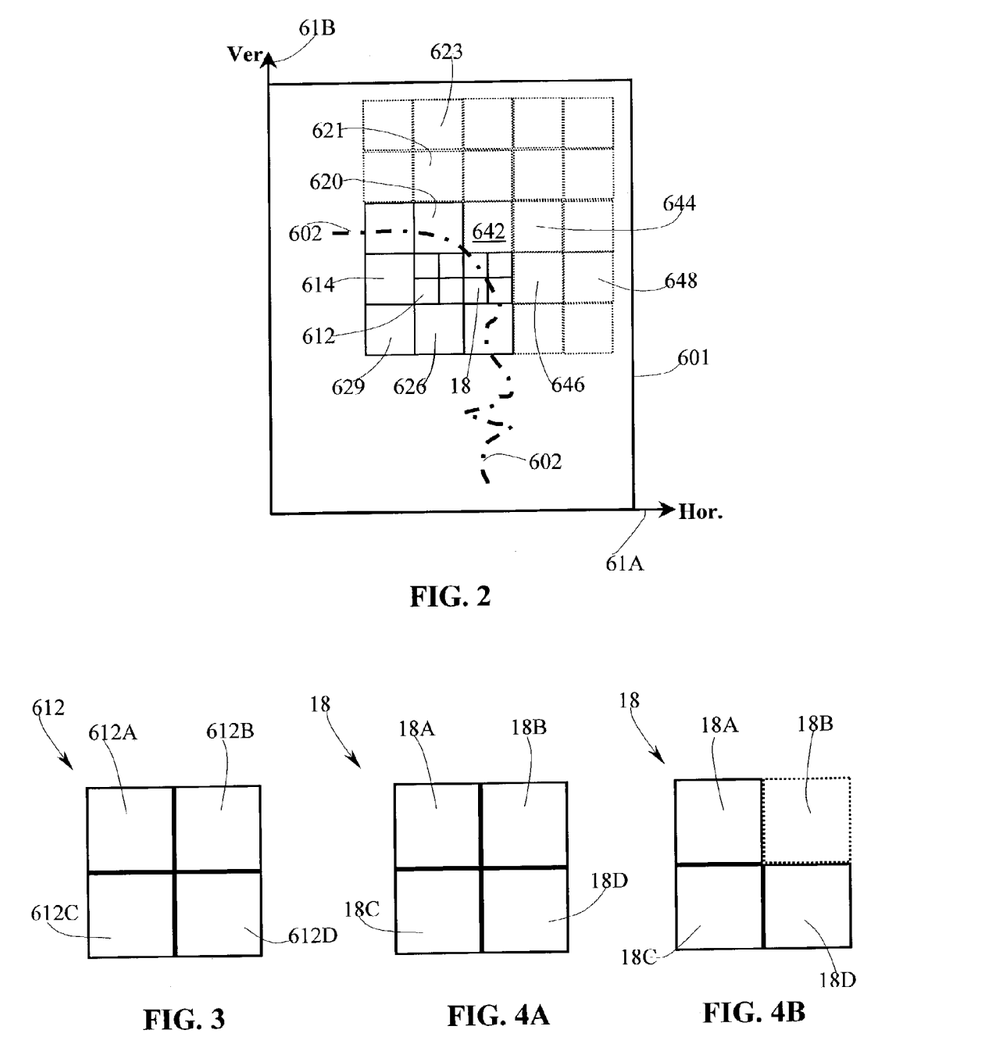

Reference is now made to FIGS. 2–6 in conjunction with FIG. 1. In FIG. 2, an image frame of a digital streaming video transmitted from a web site 300 to the client 30 is designated generally with reference number 601; an image element or object border or boundary within the image frame 601 is designated generally with reference number 602 for representing that there exist substantial color character differences between those pixels at the two sides of the image-element or object boundary 602 (Thus, such boundary is the boundary of an image element or object within the frame 601; In the example of FIG. 2, the boundary 602 simulates the shape of a human head). As shown The pixels at the upper-right side of the image element boundary or border 602 includes pixels 621, 623, 642, 644, 646, and 648, etc.; The pixels at the lower-left side of the image-element boundary or border 602 includes pixels 612, 614, 629, and 626, etc.; A pixel 18 is for representing generally those pixels lying across the image-element boundary or border 602. The image frame 601 includes a horizontal axis 61A and a vertical axis 61B. In FIG. 2, for the purpose of clarity, only a pixel block comprising a matrix of five by five (5×5) pixels covering a portion of the frame 601 is displayed, with the understanding that the entire image frame 601 is comprised of digital pixels and pixel blocks (see below).

According to the present invention, the image within the frame 601 is enhanced by a process including the steps of: (1) resolution amplification, i.e., artificially increasing the number of columns and rows of pixels of the image frame 601, and thereafter, (2) color adjustment, i.e., determining or adjusting the color characters 61Y (FIGS. 5–6) of each new pixel or cell created during the resolution amplification process according to those of the original neighboring pixels or cells, and (3) image edge sharpening, i.e., adjusting or smoothing the image-element boundary or border of the newly amplified and/or color enhanced image frame 601 or pixel blocks within the frame 601 by adjusting the color characters of those pixels lying across the image-element boundary or border 602, such as the pixel 18 of FIG. 2. These processing steps of resolution amplification, color adjustment and image edge sharpening are executed by the client computer 30 of FIG. 1. As used herein, (i) the term "color character" 61Y means the color, color contrast, brightness, saturation, hue, and/or luminescence, etc. of a specific pixel or a specific point within the frame 601; (ii) the term "color" means color frequency/wavelength and/or percentage of red, green and blue, etc.

It is preferred that, the aforementioned resolution amplification process is accomplished by dividing or splitting each original pixel (the "parent pixel") of the original image frame 601 into a plurality of "sub-pixels" or "child pixels". In FIGS. 2–4, such resolution amplification process is exemplified by dividing each original or parent pixel within the frame 601 into four child pixels or cells of equal size. For examples, as shown, (i) the original pixel 18 is divided into four child pixels or cells of equal size, including child pixels 18A (upper-left), 18B (upper-right), 18C (lower-left) and 18D (lower-right), and (ii) the original parent pixel 612 is divided into four child pixels or cells of equal size, including upper-left "child-pixel" 612A, upper-right child-pixel 612B, lower-left child-pixel 612C, and lower-right child-pixel 612D; etc. Similarly, every other pixel (e.g., pixel X) within the frame 601 may be divided into four child pixels or cells of equal sizes (i.e., upper-left XA, upper-right XB, lower-left XC, and lower-right XC). Consequently, the resolution of the image frame 601 or the selected pixel block therein, i.e., the total number of pixel columns and rows therein, is four times the original, and the quality of the image frame 601 or the selected pixel block therein may then be improved by adjusting the color characters of the newly created child pixels.

Figure 5:
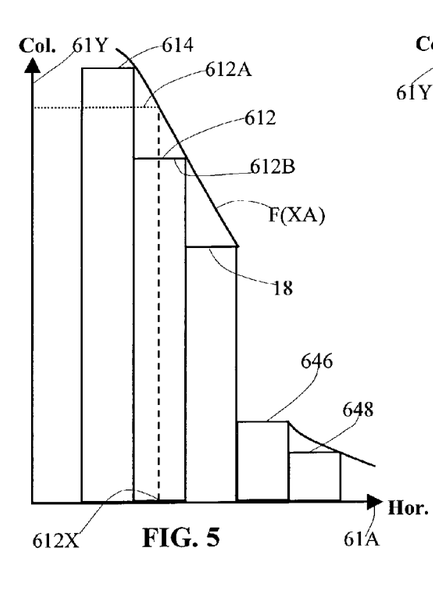

The aforementioned color adjustment process, i.e., the process of determining the color characters 61Y of the newly created pixels or cells according to those of the original neighboring pixels thereof, is exemplified in FIGS. 2–3 and 5–6 by the process of obtaining the color characters 61Y of the four newly created or "amplified" cells or child pixels 612A, 612B, 612C, and 612D that form the original parent pixel 612. As shown therein, the original parent pixels 614, 18, 646, and 648, etc. share the same row within the frame 601 as the original pixel 612; and the original parent pixels 626, 620, 621, and 623, etc. share the same column within the frame 601 as the original pixel 612. As shown in FIG. 5 for representing the horizontal direction 61A of FIG. 2, there is a substantial difference between the color characters 61Y of the two original neighboring pixels 18 and 646 in comparison to the color character differences between other original neighboring pixels, such as between the pixels 646 and 648, or between pixels 612 and 18, etc. Thus, it is determined that, the two original pixels 612 and 646 are situated at two different sides of an image element boundary (e.g. the image-element boundary or border 602 of FIG. 2), and that, the pixel(s) 18 and/or 646 are the "element-boundary pixels" that are situated at an image element boundary or boarder. Similarly, in FIG. 6 for the vertical direction 61B of the image frame 601 of FIG. 2, there is a substantial difference between the color characters 61Y of the two original neighboring pixels 620 and 621 in comparison to the color character differences between other original neighboring pixels, such as between the pixels 621 and 623, or between pixels 612 and 620, etc. Thus, it is determined that the two original pixels 612 and 621 are situated at two different sides of an image-element boundary or edge, and that the pixel(s) 620 and/or 621 are the "element-boundary pixels". Therefore, the original pixels 646, 648, and 621 and 623 will not be included in evaluating the color character values 61Y of the child pixels 612A, 612B, 612C, and 612D.

As used herein, (i) the term "element-boundary pixels" means those pixels that are situated at or close to the desired position of the boundary of an image element or object within the image frame 601 so as to provide visual effect of a boundary or edge or border of an "image element" or object within the image frame 601; and (ii) the term "image element" means and includes every visual objects or elements or characters or figures of any type or shape or a portion thereof within the image frame that can be visually identified and that, collectively and together with the image background, form the visual effect of the entire image frame. For the purposes of performing the color adjustment and/or edge sharpening processes described herein, any portion of the image frame's background may also be regarded as an image element. In some cases, the image element or object within an image frame may have "thick" border comprising many layers or lines of pixels, and the differences in color character between those pixels within such border and those outside such border can be easily identified. In such a situation, during the color-adjustment process, (i) the border itself within the image frame or within a pixel block can be regarded as an "image element" having its own boundary or edge, and (ii) the term "element-boundary pixels" means those pixels that are situated at or close to the boundary or edge of such "thick border".

As described above, the color characters of the four newly created cells or child pixels 612A, 612B, 612C, and 612D that form the original parent pixel 612 are determined according to those of the original neighboring parent pixels or cells. The present example of FIGS. 2–3 and 5–6 adopts the following rules in applying the color adjustment method of the present invention: (1) the color character value 61Y of the upper-right child pixel 612B remains the same as that of its parent pixel 612; (2) the color character value 61Y of the upper-left child pixel 612A is determined according to those original neighboring pixels that share the same row as the pixel 612; (3) the color character value 61Y' of the lower-right child pixel 612D is determined according to those original neighboring pixels that share the same column as the pixel 612; (4) the color character value of the lower-left child pixel 612C is made equal to the average value of that of its parent pixel 612 and its three neighboring original pixels 614, 626, and 629. In FIG. 5, since the original pixels 612 and 646 are situated at two different sides of an image-element boundary or border 602, the pixels 646 and 648 are not used for determining the color character value 61Y of the upper-left child pixel 612A. Similarly, in FIG. 6, since original pixels 612 and 621 are situated at two different sides of an image-element boundary or border 602, the pixels 621 and 623 are not used for determining the color character value 61Y' of the lower-right child pixel 612D.

As shown in FIG. 5, a math function F(XA) is obtained based on three reference points in the coordinate system of "61Y v.s. 61A", including the color character values 61Y of the original pixels 612, 614, and 18 and the respective horizontal positions 61A of the upper-right corners of these original or parent pixels 612, 614, and 18 within the frame 601. Similarly, in FIG. 6, a math function F'(XB) is obtained based on three reference points in the coordinate system of "61Y' v.s. 61B", i.e., the color character values 61Y' of the original pixels 626, 612, and 620 and the respective vertical positions 61B of the upper-right corners of these original pixels 626, 612, and 620 within the frame 601. Thus, (i) the value of Y1, the color character value of the upper-left child pixel 612A, is obtained according the function F(XA) and the horizontal position 612X of the center of the pixel 612 within the frame 601, i.e., Y1=F(XA=612X); (ii) the value of Y2, the color character value of the lower-right child pixel 612D, is obtained according to the function F'(XB) and the vertical position 612Y of the center of the pixel 612 within the frame 601, i.e., Y2=F'(XB=612Y); (iii) the value of Y3, the color character value of the lower-left child pixel 612C, is made equal to the average of the color character values 61Y of the four original or parent pixels 612, 614, 626, and 629, i.e., Y3=[$61Y_{612}+61Y_{614}+61Y_{626}+61Y_{629}$]/4; and (iv) the value of Y0, the color character value of the upper-right child pixel 612B, is made equal to that of its parent pixel 612, i.e., Y0=$61Y_{612}$.

Figure 6:
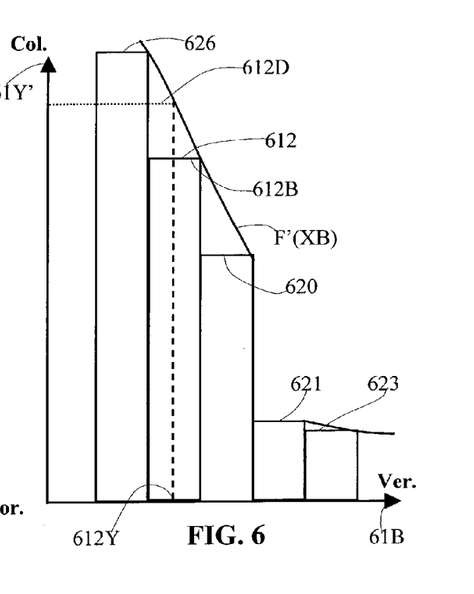

One skilled in the art would understand that, (1) the number of reference points utilized in obtaining the math functions F(XA) and F'(XB), i.e., the number original neighboring pixels used for determining the color character values Y1 and Y2, respectively, of the upper-left child pixel 612A and the lower-right child pixel 12D may be dependent on computing power of the client computer 30; that (2) the math functions F(XA) and F'(XB) may be in any form, such as a straight line or a polynomial or the like or in other type of math formula form; that (3) the number of parameters in the math functions F(XA) or F'(XB) may be dependent on the aforementioned number of reference points utilized for obtaining said math functions; and that (4) more neighboring parent or original pixels situated at different geometric dimension may also be used to determine the values of Y1, Y2, and Y3. For example, in determining the color character value Y1, a two dimensional math function of Y1=F"(XA, XB) may be created such that the five original pixels 612, 614, 626, 629 and 18, which, together, are of two-dimensional geometric form and thus requires a two-dimensional function, can be used to determine the color character value Y1 of the child pixel 612A. It is also understood that, multiple resolution amplification and color adjustment processes as described above may be conducted by the client computer 30. For example, in a second stage resolution amplification process, the child pixel 612A can be further divided into four "child—child" or "grandchild" pixels by employing the same methods described above for determining the color characters of said grandchild pixels. However, it is preferred that the image edge sharpening process described in the ensuing sections be executed before performing said second stage resolution amplification process.

With reference to FIG. 4 in conjunction with FIG. 2, as described above, it is determined that the original pixel 18 is an "element-boundary pixel" that lies across an image element boundary 602, i.e., lower-left corner of the pixel 18 is situated at one side (lower-left side) of the image-element boundary or border 602, and the upper-right corner of the pixel 18 is situated at the other side (upper-right side) of the image-element boundary 602. After the resolution amplification and/or color adjustment processes described above, the pixel 18 is divided into four child pixels, i.e., child pixels 18A, 18B, 18C, and 18D, with the color character values of these child pixels being determined according to those original pixels at the lower-left side of the image-element boundary 602. During the edge sharpening process, it is determined that at least two sides of the child pixel 18B are "completely exposed" to or have full contact with those original parent or child pixels that belong to the upper-right side of the image-element boundary 602. Thus, the child pixel 18B is converted to belonging to the upper-right side of the image-element boundary 602 by, for example, assigning its color character value $61Y_{18B}$ to the average color character values of the three neighboring pixels 642, 644, and 646 at the upper-right side of the image-element boundary 602. As indicated in FIG. 4, the four edges of the child pixel 18B is "converted" from solid lines of FIG. 4A to dashed lines of FIG. 4B.

After performing the resolution amplification and color adjustment processes described above and before the edge sharpening process, the line shape of the image-element boundary 602 may be determined, which, in the present example, would lead to a conclusion that the upper-right child pixel 18B is likely to have more "exposure" to or direct full contact with the upper-right side of the image-element boundary 602 in comparison to other child pixels 18A, 18C and 18D. Thus, the above-described edge sharpening method, i.e., by evaluating the "full exposure" of each edge of a child pixel to the other side of an image-element boundary, may be applied to the upper-right child pixel 18B first before being applied to other child pixels. Thereafter, in evaluating the child pixel 18A, it is determined that at least two sides thereof are "completely exposed" to or have direct full contact with those original or child pixels at the lower-left side of the image-element boundary 602. Consequently, the color character of the child pixel 18A will remain unchanged during the current edge sharpening process. Similarly, the color character of the child pixel 18C will also remain unchanged. The color character of some of the child pixels, such as the child pixel 18D may or may not remain unchanged during an edge sharpening process, depending on the sequence of the foregoing color adjustment and edge sharpening processes, i.e., which child pixel or which group of child pixels is to be adjusted first during the current processing cycle. Usually, the uncertainty resulting from such selection of processing sequence will not affect the quality of the final results.

Thus, after performing the foregoing processing cycle of resolution amplification, color adjustment and image edge sharpening by the client computer 30, the color resolution of the image frame 601 is increased, and the image-element boundary within the frame 601 is improved since those pixels lying across the image-element boundary 602 are smaller. One skilled in the art would understand that the processing cycle of resolution amplification, color adjustment and image edge sharpening may be performed many times by the client computer 30, depending on its processing power or speed, so as to provide image frames with much better color resolution and image quality. As a result thereof, the digital streaming video to be displayed on the computer 30's monitor or on the TV set 900 can have much larger image frame with the same or similar image quality as compared with that of the original small-image-frame video stream. In regarding the above-described H.263 or other standards for compression or encoding and decoding of digital video signals, the image enhancement process described herein can be performed before the decoding process, such, for example, as being applied only to the independent- or I-frames. Alternatively, the image enhancement process described herein can be performed after the decoding process if the client computer 30 has enough processing power.

As described above, after performing the resolution amplification process and during the color adjustment process, the color character 61Y of every pixel is to be determined and the element-boundary pixels are to be identified. Thus, the color adjustment and edge sharpening processes may be performed concurrently during a processing cycle, i.e., if it is determined that a parent original pixel is an element-boundary pixel, the process of adjusting the color characters of its child pixels based on its neighboring pixels and the process of edge sharpening by evaluating the "complete exposure" or full contact of each side of such child pixel to either side of the image-element boundary can be performed concurrently. For example, in FIGS. 2 and 4, if the sequence of processing pixel blocks within the frame 601 is from lower left (first) to upper right (last), the foregoing processes of color adjustment and edge sharpening may be applied to the child pixels 18A–18D before the commencement of adjusting the color character of a parent pixel or its child pixel at the upper right corner of the frame 601. Alternatively, after performing the pixel resolution amplification process, the sequence of performing the color adjustment and edge sharpening as described in the previous sections may also be reversed, i.e., the process of edge sharpening may be performed before color adjustment instead of thereafter; In the example of FIGS. 2 and 4, the process of "converting" the child pixel 18B from "solid line" (belonging to the lower-left side of the element boundary) to "dashed line" (belonging to the upper-right side of the element boundary) may be done before adjusting the color characters of those nearby pixels that are not "element-boundary pixels".

It is preferred that, the processing cycle of color adjustment and edge sharpening is performed "block by block", i.e., the complete cycle is applied to a block of pixels before commencement of applying such cycle to another adjacent "pixel block". If necessary, there may be overlaps between some of the adjacent or neighboring blocks. It is preferred that the size of such "pixel block" be substantially larger than a single pixel. In the example of FIG. 2, the pixel block shown within the frame 601 is a "5×5" pixel block. In another example, if an original video image frame comprises "242×242" pixels, the size of each pixel block may be, for example, "32×32" pixels, and the "width" of overlaps between adjacent "pixel blocks" may be two column/row of pixels; thus the original "242×242" pixel frame is comprised of a "8×8" (or 64) overlapped pixel blocks; The processing cycle of color adjustment and edge sharpening is completely applied to a selected one of the 64 pixel blocks first before being applied to its neighboring block, and such processing cycles are conducted block by block, sequentially and continuously until after reaching all the pixel blocks within the image frame. Alternatively, if the size of the original image frame is not large, the entire image frame may be treated as one single pixel block rather than dividing the image frame into several pixel blocks when applying the foregoing processing cycle of color adjustment and edge sharpening.

Those skilled in the art would also understand that the foregoing processing cycle of color adjustment and edge sharpening may or may not be performed equally throughout an image frame. For example, with respect to the image frame 601 of FIG. 2, a relatively simpler processing cycle may be applied to those pixels or pixel blocks near the four corners of the frame 601 where the image patterns is simple so as to conserve computing resources, and a relatively sophisticated processing cycle may be applied to those pixels or pixel blocks near the center of the image frame where the image patterns is more complex so as to provide better image quality.

Figure 7:
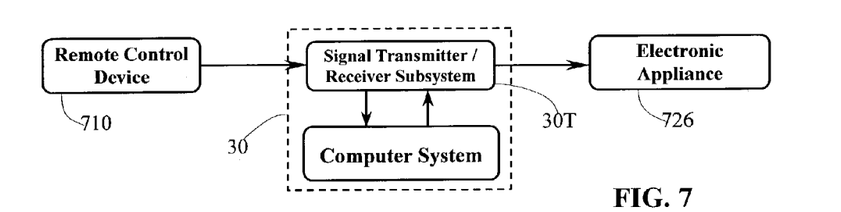
FIGS. 7–8 illustrates the methods of using the remote control and the computer of FIG. 1 to control an electronic appliance according to another aspect of the present invention.
Figure 8:
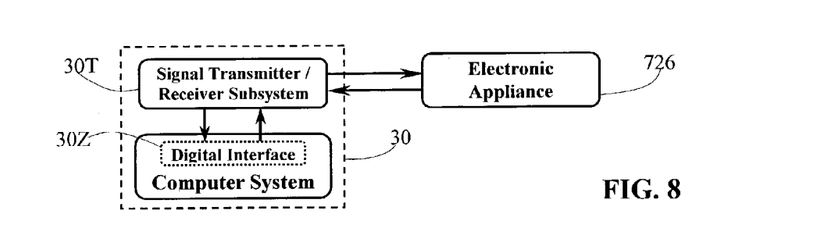

Reference is now made to FIGS. 7–8 in conjunction with FIG. 1. According to another aspect of the present invention, "Indirect Control" method is applied when using the remote control 710 for a general-purpose remote control of other electronic devices. For example, in FIG. 1, the computer 30 is provided with means for transmitting/receiving remote-control signals and associated software system, so as to simulate the functioning of a general-purpose handheld remote control device; if the remote control 710 is to be "adjusted" to control, for examples, the devices 702 or 706 or the toy 1, rather than adjusting the remote control 710 itself, such an "adjustment" is made to the respective software application installed in the computer 30 such that, the desired (or adjusted) remote control signals 74B/74A be transmitted from the computer 30 to the device 702/706 respectively in response to the user operation of the remote control 710, while the control signals transmitted from the remote control 710 to the computer 30 are not "adjusted" (thus "Indirect Control").

As shown in FIG. 7, the computer system 30 of FIG. 1 is provided with a signal transmitter/receiver subsystem or peripheral 30T for interacting with the remote control 710 and with an electronic appliance 726 via wireless signals. The wireless signal employed for such remote control interaction may be, preferably, RF signal. Alternatively, such wireless signal may be infrared (IR) or intermediate frequency (IF) or modulated light signal or other type of commonly used wireless signal for remote control of an electronic appliance. It is preferred that the signal transmitter/receiver subsystem 30T is provided with means for transmitting and receiving wide range(s) of commonly used signal spectrum so as to facilitate the functioning of general-purpose remote control. In addition, each one of the electronic devices feasible for remote control, such, for examples, as the device 706, 702, or the toy FIG. 1 of FIG. 1, may be provided with an application icon or link in the computer system 30 that may be shown on the window desktop; When a user click on such application icon to activate the associated remote-control software application program, the electronic appliance associated therewith may then be control by the remote control device 710.

Apparently, the signal transmitter/receiver subsystem 30T is to be provided with a digital interface system 30Z (FIG. 8) so as to interact with other components or computing/processing unit of the computer 30. As a result, the computer 30 can be programmed to interact with the remote control device 710 or to control the electronic appliance 726 without providing the remote control device 710 and the electronic appliance 726 with complex digital interface. One skilled in the art would appreciate that such a method may also be applied generally to using the computer 30 to control an electronic appliance 726 without providing the appliance 726 with digital interface, and the interaction between the computer and the appliance 726 may be either one-way (FIG. 7) or two-way (FIG. 8) interaction without providing the electronic appliance with digital interface. In FIG. 8, the computer system 30 may be a mouse-window type computer system or a remote-control based computer system or other type of commonly used computer system. The computer 30 may be connected to a network, such as the Internet, such that a user can control the electronic appliance 726 from a remote location by accessing the computer 30 from another computer provided at said remote location through said network. The remote control system of FIGS. 7–8 may be used to control or interact with, for examples, a clock, an exercise device such as a treadmill, an air condition system, a microwave, a TV set, a VCR or DVD player, a sound system, a radio, or an electronic toy, etc.

Since the transmitter/receiver 30T is provided with wide-range signal spectrum capability, the computer 30 may be provided with "button identification/assignment" software application program for identifying a button on a remote control and assign such button to a selected button on a general purpose remote control device. For example, if the electronic appliance 726 is provided with an original handheld remote control device 710x from the manufacture that has a button 710x-a, and a user wants to designate a button 710-A on the general-purpose remote control device 710 to replace the functioning of the button 710x-a of the remote control device 710x; the processes of identifying the buttons 710x-a and 710-A are by simply clicking on these buttons on áthe remote control devices 710x and 710 respectively, and the resultant wireless signals will then be received by the computer 30 and by the button identification/assignment application program, which may, for example, assign a reference code and/or a image icon to each said buttons so identified; button identification/assignment application program may then be used to link or associate the button 710-A to the button 710x-a such that, when the user depress or click on the button 710-A of the remote control 710, the wireless signals transmitted from the subsystem 30T of the computer 30 to the appliance 726 will be the same as the wireless signals transmitted thereto when the user depress the button 710x-a of the remote control device 710x; Similarly, the button 710x-a of the remote control device 710x may also be assigned to a display button of a toolbar or image shown on the computer monitor such that when a user click on said toolbar or said display button using a computer mouse, the wireless signals transmitted from the subsystem 30T of the computer 30 to the appliance 726 will be the same as the wireless signals transmitted thereto when the user depress the button 710x-a of the remote control device 710x.

The following disclosure regarding computer remote control relates to and refers to the reference numbers in the drawings of the U.S. Provisional Application No. 60/421,493 filed Oct. 28, 2002 by the applicant of the present application.

The control of the multimedia system of FIG. 1 is provided by the hand-held remote control device 710, which includes computer and Internet/web browser operation buttons and scrolling means (as described below), a conventional number/letter button assembly 720 for TV-channel selection, TV-channel changing buttons 72U and 72D for increasing and decreasing the current TV channel number respectively, a TV channel return button 72R, and conventional volume control buttons 71B and a mute button 71M. Alternatively, a conventional VCR-, CD-, or DVD-type media-player operation assembly 770 that includes "play", "fast forward", "fast reverse", "pause", and "stop" buttons, etc. may also be included.

It is understood that, the foregoing "conventional" TV control buttons may be employed for interacting with all components of the multimedia system of FIG. 1, and that, some of said "conventional" TV control buttons may also be used for computer operations. For examples, (1) In addition to the function of conventional TV channel selection, the number/letter buttons 720 may also be used to access a computer application program, as described in details herein below; (2) The channel return button 72R may be used for controlling the currently active computer-TV window by switching the display content therein back to the previously viewed TV channel, etc. The remote control 710 may, optionally, includes a device-selection button 71A for selecting which device (e.g., the TV, VCR, DVD, the toy FIG. 1, or the windows of the Computer system 30, etc.) is to be currently controlled by the remote control 710.

It is appreciated that, the basic concepts of computer remote control of the present invention include, (i) a simple remote control operation will instruct an active window to display a listing of application buttons or links (e.g., a toolbar, a bookmark listing, etc.), and in the meantime, restrict the cursor within the display area of such listing so as to facilitate the user's desired action of easily browsing through and clicking on one of the application buttons or links so listed; (ii) a limited number of press button combinations of the remote control 710 will provide unlimited shortcut means for easy access to the user's desired applications or commands.

It is preferred that, the remote control 710 includes a display buttons 71Q for display control, such, for examples, as opening/closing a new window on a display device 900 or pulling down or expanding a menu (see below), by interacting with the Computer operation system 30 via wireless signals, and that, TV channel selection is the default function provided by the number buttons assembly 720. For examples, (i) in order to display TV channel 7 within a new TV-window 913 (window No. 3), a user will depress the display button 71Q and then the number button "3" for opening a new window 913 on the display 900, then the user can press the number button "7" for displaying the TV channel 7 within the TV-window 913; (ii) if the user presses the number button "3" without depressing the button 71Q or any other functional button therebefore, the current active window will be switched to TV channel No. 3.

It is preferred that each said TV-window is provided with a simple window ID so as to facilitate user control. For example, the TV-windows 913, 912, and 910 are provided with an ID 92C (three dots), 92A (one dot), and 92B (two dots) for indicating that they are window No. 3, 1, and 2 respectively. Such window IDs 92A, 92B, and 92C may also service the purpose of indicating the current "active" window, i.e., which TV-window is currently controlled by the remote control 710, by, for example, highlighting or brightening the ID of the active window. Apparently, other methods, such for example as highlighting the frame of a Window, may be used for indicating the currently active window.

Alternatively, two or more remote control devices may be provided for control of different windows on the same display 900 which is supported or controlled by the same computer system 30, in which case the computer and the remote control devices may be provided with device-identification systems such that a window opened by one remote control device will not response to control signals transmitted from other remote control device(s).

A cancel or close button may be provided on the remote control 710 such that, the combination of depressing the display button 71Q and then the cancel/close button will close the current active window. For example, if the current active window is the TV-window 913 and the user wants to close the TV-window 912 (window ID No. 1), the user will first switch from the TV-window 913 to the TV-window 912 by pressing the "Disp" button 71Q and the "1" button, then the user can close the TV-window 912 by the combination of depressing the "Disp" button 71Q and then said cancel button. The TV signals 270 transmitted from the broadcast center 208 may include display instructions with respect to how many TV-windows are desired for a current TV program 901, and/or the default size, position, and content of each such TV-window. A web page or web content associated and/or in synchronization with the current TV program and displayed in a separate window may provide sub-content information (e.g., different camera angle for a sport event) and application link therefore such that "clicking through" such application link using the remote control 710 will cause the respective sub-content in connection with the current TV program be displayed within a designated or newly generated Window.

It is preferred that TV-computer operation system 30 is a web-browser based operation system, i.e., the full functionality of a conventional web browser is integrated or incorporated into the basic functionality of said TV-computer operation system 30. Accordingly, the remote control 710 is provided with short-cut press buttons for interacting with the web-browser functions of the TV-computer operation system 30.

It is preferred that the remote control 710 includes a "bookmark" button 73X for adding a web page(s) into the bookmark list (or the like) of the computer system 30's web browser. It is preferred that, (i) if the current active Window only displays a TV program 901, depressing the "bookmark" button 73X will cause the web browser to bookmark the default or synchronized Web page associated with the current TV program 901, regardless of whether such web page is displayed within a window; and that (ii) if the current active window(s) shown on the TV set 900 displays a web page(s), depressing the "bookmark" button 73X will cause the web browser to bookmark said web page(s) shown.

It is also preferred that, the remote control 710 further includes a "buy" button 73B for facilitating online purchasing by activating an online identity-authentication/purchasing application installed in the computer 30. For examples, if a web page shown on the display 900 include a "purchase" item available for online purchasing, when a user press the "buy" button 73B to activate said online identity-authentication/purchasing application, the associated confirmation information, such as the price, name, shipping address, credit card account information, etc., and/or simple instructions will be displayed on the display 900 within a designated window; the user can then press the "buy" button 73b again or a "go" button 74G (see below) on the remote control 710 to complete the transaction; Apparently, the system may request that the user provide password using, for example, the number buttons 720 of the remote control 710 before the purchasing process is completed.

The web page or content associated or synchronized with the current TV program and provided by the respective web site may also include TV-display instruction for instructing the TV-computer system 30 as to the desired size, position, and background color, etc. of the TV-window designated or opened for displaying a desired content.

The remote control 710 also includes a "Go" button 74G for interacting with or activating a desired application, a "cursor float" control button 74F for controlling the "floating status" of the cursor 920, and a cursor control assembly 740. As shown, the assembly 740 includes a vertical rolling wheel 74V and a pair of horizontal rolling wheels 74R and 74L. The vertical rolling wheel 74V is provided for controlling continuous vertical-only scrolling or cursor movement on the TV display 900; the two horizontal rolling wheels 74R and 74L are provided for controlling continuous horizontal-only scrolling or cursor movement. The cursor 920 is provided with at lease two modes, including a "floating mode" and a "local mode"; pressing the button 74F will cause the cursor 920 to switch between said at lease two modes. (1) If the cursor 920 is in said floating mode, a user may cause the cursor 920 to move freely and continuously throughout the entire display area of the TV set 900 by operating the rolling wheels 74V, 74L and 74R; in this case, the cursor 920 is not restricted within a specific Window or application area; (2) Depressing the cursor float button 74F will cause the cursor 920 to switch from said floating mode to said local mode such that the cursor will provide scrolling function for the respective local window application area.

It is preferred that while in local mode, the cursor 920 provides two functions, (1) if the respective local application area is not fully displayed, operating the rolling wheels 74V, 74L, and/or 74R will cause the scrolling or moving of view of the entire local application display through within the respective window, (2) after scrolling to an end of the respective local application display within the window, the cursor 920 itself will, then, start to move within said local application area if the user repeats the same rolling wheel operation. For the purposes of window control, the tool bar or menu bar area of an application or window can be regarded as a sub-window within the application window. While the cursor 920 is located at such toolbar area in local mode, the user can start to navigate or browse through the menu/tool bar area sub-window. If the menu or toolbar sub-window does not show all the available buttons, rolling the wheels 74V, 74L or 74R will first cause the entire menu or toolbar to slide horizontally or to roll vertically before the cursor 920 start to browse through each individual task buttons therein, while operating another set of navigation buttons 74T/74H provided on the remote control 710 will cause the cursor 920 to browse through each individual task button first before causing said entire menu or toolbar to slide horizontally or to roll vertically.

The display 921 is an exemplary desktop display customized by a user, which includes an interactive section 94D for display of live or updated information provided by a web site, such as sports/news update, email update, live stock quote, etc. An icon within the window 912 may also be made interactive. For examples, an Email icon 95C and the number 95C' therein indicate that there is currently one new email received. Some of the application or web link or file icons displayed within the window 912 are arranged within a four by four matrix 980. Each matrix cell includes one application icon, and is identified by a matrix ID number. As shown, the ID numbers 11, 14, 41 and 44 are assigned to the matrix cells 98A, 98B, 98C, and 98D respectively, so as to facilitate easy identification of each matrix cell and to allow a user to use the number keys 720 in combination with a function key 75F provided on the remote control 710 to access the applications associated with these matrix cells and icons.

The window 912 may also includes an alert component 981, which may be situated, for example, at the bottom of the window 912. The alert component 981 as shown includes an email-alert icon 98Z for indicating whether there is any urgent email; a deadline alert icon 98X for indicating whether a bill-pay or other type of deadline is getting close; and an appointment alert icon 98Y, etc. When there is no alert, the area 981 may automatically hide. One skilled in the art would appreciate that such type of alert component may be provided for any type of web/web browser or window applications.

The display button 71Q of the remote control 710 may also service as a "shortcut" for viewing and navigating menus and other information provided by the Window 912. For example, pressing the display button 71Q and then the bookmark button 73X of the remote control 710 will pull down or expand a bookmark menu 93F of the window 912.

The remote control 710 also includes an "App tool" button 73I for displaying/hiding the user's favorite toolbar provided for the current window or window application program. For example, if the current application is a word processor, pressing the "App Tools" button 73I will, (i) if the toolbar 990 was not displayed, instruct the window 912' to display the toolbar 990, and (ii) cause the cursor 920 to "jump" into the toolbar area 990 in its local mode such that, the user could easily navigate or browse through these tools 991–997 using the rolling wheels 74V, 74L and 74R and/or using the buttons 74T/74H of the remote control 710, and execute or "click on" any of these tools 991–997 using the "Go" button 74G; Pressing the "App Tools" button 73I again will hide the toolbar 990. It is preferred that some of the number keys 720 on the remote control 710 are predefined for access to some commonly used tools through combination with the "App tool" button 73I. For example, the combination of pressing the "App tool" key 73I and the number key "3" on the remote control 710 would be equivalent to clicking on the "close" icon 993.

It is appreciated that, using the combinations of pressing the "disp" key 71Q and other buttons on the remote control 710 may provide easy access to any application tools desired. For examples: (I) Since most of the window applications include expandable menus (or menu bar) at the top that contain listings of all commands available for such application (e.g., for a word processor, the menu bar may include "File", "Edit", "View", "Format", "Tools" menus, etc.), the combination of pressing the "disp button" 71Q and the "App tools" button 73I of the remote control 710 will, (i) if the application menu bar was not displayed within the window, instruct the window 912' to display the menus or the menu bar, (ii) cause the cursor 920 to "jump" onto such menu bar in its local mode, and (iii) expand one of the menus located by the cursor 920; When forcing the cursor 920 to the right or left, it will expand the respective neighbor menu(s); The application command located by the cursor 920 in the expanded menu may then be executed or "clicked on" by pressing the "Go" button 74G of the remote control 710; (II) The combination of pressing the "disp button" 71Q and the "App tools" button 73I and then the number "0" button of the remote control 710 will, (i) if the alert area 981 was not displayed within the window 912, instruct the window 912' to display the alert area 981, and (ii) cause the cursor 920 to "jump" into the alert area 981 in its local mode; The user could then click on any of the icon therein using the "Go" button 74G of the remote control 710.

Naturally, the embodiments of the streaming video image enhancement methods and system of the present invention are not limited to the above-described examples or to those examples shown in the drawings. It will be understood that various substitutions, rearrangements and other changes to the forms and details of the examples can be made by those skilled in the art without departing from the scope of the invention as set forth in the annexed claims.

I claim:

1. A method for enhancing digital video such that an original small-frame digital video can be enlarged and displayed as a large-frame video with high resolution and quality, said original digital video including a sequence of image frames, each said image frame comprising limited number of columns and rows of pixels, said method comprising the steps of:

increasing number of rows and columns of pixels of each said image frame; and adjusting color characters of each new pixel created by said step of increasing;

said step of increasing including dividing each pixel of the image frame of said original video into a plurality of child pixels, said new pixels comprising said child pixels;

said step of adjusting comprising making the color characters of one of said child pixel equal to that of its parent pixel and determining the color characters of other child pixels of said parent pixel according to the color characters of the parent pixel and the neighboring pixels.

2. The method of claim 1, wherein said step of determining the color characters of said other child pixels includes determining whether said parent pixel is situated close to an image element boundary based on evaluation of amount of changes of color character differences between said parent pixel and its neighboring pixels, so as to exclude those neighboring pixels that are deemed situated at a different side of any image element boundary and thus belonging to a different image element in determining the color characters of said other child pixels.

3. A method for enhancing digital video such that an original small-frame digital video can be enlarged and displayed as a large-frame video with high resolution and quality, said original digital video including a sequence of image frames, each said image frame comprising limited number of columns and rows of pixels, said method comprising the steps of:

increasing number of rows and columns of pixels of each said image frame; and adjusting color characters of each new pixel created by said step of increasing;

said step of increasing including dividing each pixel of the image frame of said original video into a plurality of child pixels, said new pixels comprising said child pixels;

said step of adjusting including determining whether a pixel is an element-boundary pixel that contributes to the visual effect of a boundary of an image element within said image frame by evaluating amount of changes of color character differences between said pixel and its neighboring pixels.

4. The method of claim 3, wherein said step of adjusting further includes determining color characters of each said new pixel created by said step of increasing according to its neighboring pixels that are situated at the same side of any image element boundary.

5. The method of claim 3, wherein said step of adjusting further includes, when a pixel is an element boundary pixel, determining whether to make the color character of each child pixel of said boundary pixel equal to that of a neighboring pixel that belongs to the other side of said boundary based on whether said child pixel of the boundary pixel has more than two edges that are in direct and full contact with those pixels that belong to said other side of said image boundary.

6. A method for enhancing digital video having a sequence of digital image frames, each said image frame comprising limited number of columns and rows of pixels, said method comprising the steps of:

dividing each said pixel of said image frame into a plurality of child pixels; and adjusting color characters of said child pixels;

said step of adjusting including the step of determining the color character of each said child pixel based on that of its parent pixel and its neighboring pixels.

7. The method of claim 6, wherein said step of determining the color character of each said child pixel includes evaluating amount of changes of color character differences between the child pixel and its neighboring pixels so as to exclude those neighboring pixels that appears to belong to different image element.

8. The method of claim 6, wherein said step of determining the color character of each said child pixel includes making the color characters of one of said child pixel equal to that of its parent pixel and determining the color characters of other child pixels of said parent pixel according to the color characters of the parent pixel and its neighboring pixels.

9. The method of claim 8, further comprising evaluating amount of changes of color character differences between said parent pixel and its neighboring pixels so as to exclude those neighboring pixels that appears to belong to a different image element in determining the color characters of said other child pixels.

10. The method of claim 6, wherein said step of adjusting includes determining whether an original pixel of said image frame is an element boundary pixel that contributes to the visual effect of a boundary of an image element, by evaluating amount of changes of color character differences between said original pixel and its neighboring pixels, and when said original pixel is an element-boundary pixel, determining whether to make the color character of a child pixel of said boundary pixel equal to that of an immediate neighboring pixel thereof that belong to a different side of said image element boundary based the number of edges of said child pixel of said boundary pixel that has direct and full contact with those pixel that belong to said different side of said image boundary.

11. The method of claim 6, wherein said step of adjusting includes determining whether an original pixel of said image frame is an element boundary pixel that contribute to the visual effect of a boundary of an image element within said image frame, and when said original pixel is deemed an element boundary pixel, determining to which side of said boundary the neighboring pixels of said original pixel belong, by evaluating amount of changes of color character differences between said original pixel and said neighboring pixels.

12. The method of claim 11, wherein said step of adjusting further includes, when said original pixel is deemed an element boundary pixel, determining whether to switch a child pixel of said original pixel to belonging to the other side of said boundary in determining the color character of said child pixel of said original pixel based on number of edges of said child pixel of said original pixel that has direct and full contact with said neighboring pixels that belong to said other side of said boundary.

13. The method of claim 12, wherein said step of adjusting further includes, when said child pixel of said original pixel is not switched to belonging to said other side of said boundary, determining the color character of said child pixel of said original pixel based on the color characters of said original pixel and said neighboring pixels that are deemed belonging to the same side of said boundary as said original pixel; and when said child pixel of said original pixel is switched to belonging to said other side of said boundary, determining the color character of said child pixel of said original pixel based only on the color characters of the neighboring pixels that are deemed belonging to said other side of said boundary.

* * * * *